No. 885,854. PATENTED APR. 28, 1908.
T. W. MORRELL.
APPARATUS FOR PACKING CAMES.
APPLICATION FILED APR. 8, 1907.
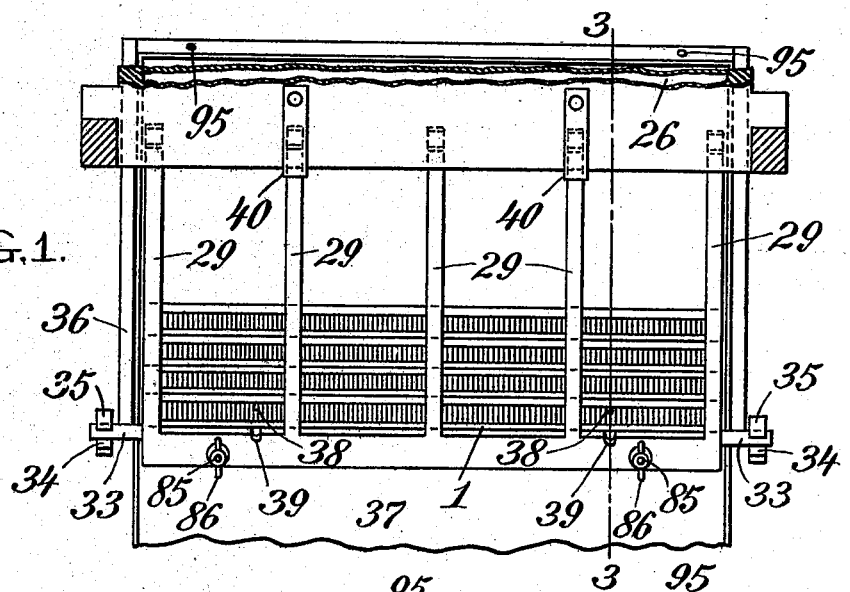
FIG. 1.
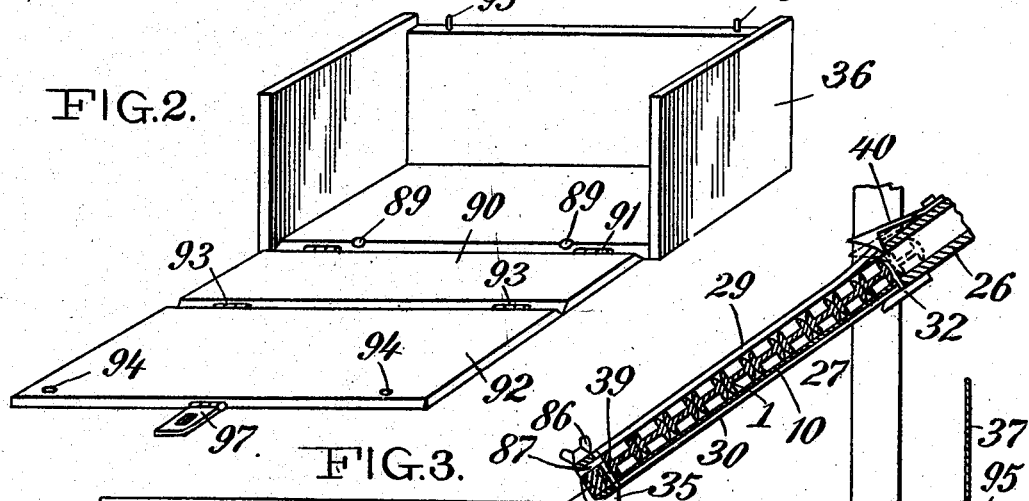
FIG. 2.
FIG. 3.
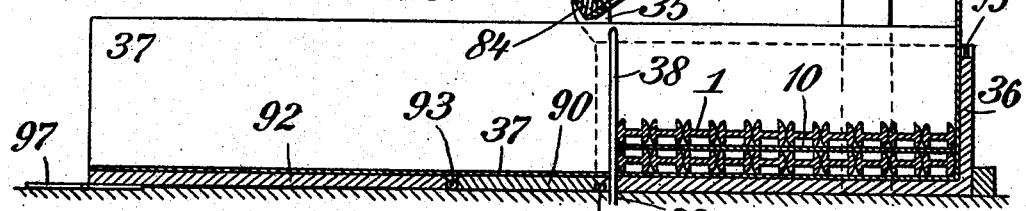
FIG. 4.
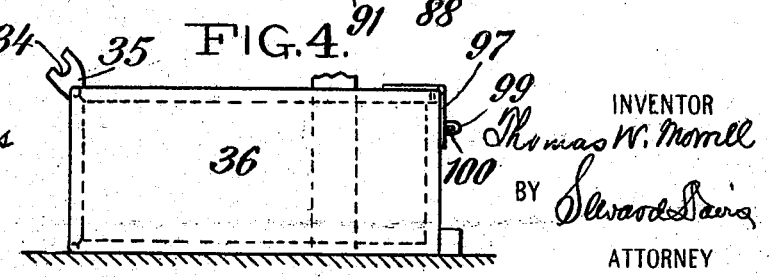
WITNESSES:
Oliver Williams
Edmund F. Davis
INVENTOR
Thomas W. Morrell
BY Edward Davis
ATTORNEY
THE NORRIS PETERS CO., WASHINGTON, D. C.

UNITED STATES PATENT OFFICE.

THOMAS W. MORRELL, OF BLOOMFIELD, NEW JERSEY.

APPARATUS FOR PACKING CAMES.

No. 885,854.

Specification of Letters Patent.

Patented April 28, 1908.

Application filed April 8, 1907. Serial No. 367,122.

*To all whom it may concern:*

Be it known that I, THOMAS W. MORRELL, a citizen of the United States, residing in the town of Bloomfield, county of Essex, and State of New Jersey, have invented certain new and useful Improvements in Apparatus for Packing Cames, of which the following is a specification.

My invention relates to devices for receiving leaden cames from a continuously operating came producing machine, transferring them to, and packing them in a suitable packing and shipping receptacle. Owing to the soft metal from which cames are made, they are very easily nicked or bent, and great care has to be exercised in handling and packing them to keep them in perfect condition for use. I accomplish this result by providing a portable receptacle or chute, which is formed to receive from the producing machine a number of the cames side by side in a single layer. The bottom of the chute is formed of spaced strips or fingers. After the chute is filled, it is transferred to the packing receptacle and the layer of cames is removed from the former into the latter in any suitable way, preferably by placing the chute in the packing receptacle, inserting upright pins between the strips forming the bottom of the chute and back of the cames, and then withdrawing the chute while holding the pins and cames stationary. A uniform layer of cames is thus obtained in the packing box without the necessity for separately handling each came, and, therefore, rapidly and without danger of injury to the articles packed. I preferably line the packing receptacle with waterproof packing, such as paraffin paper, to keep the cames dry and prevent oxidation, and may also provide a sheet of the packing between each layer of the cames.

In my applications Serial No. 367,121 filed April 8th, 1907, and Serial No. 401,397 filed November 9th, 1907, I have shown machines for continuously forming, cutting and delivering cames with which the present apparatus is especially adapted to be used, but it is not limited to use therewith, but is equally valuable for use with any other form of machine, or for the handling of articles other than cames.

Reference is hereby made to the accompanying drawing of which

Figure 1 is a plan view partly broken away, of a chute removably applied to a fixed chute forming a part of the came producing apparatus, said removable chute being partly filled with cames of uniform length. Fig. 2 is a perspective view of a receptacle adapted to receive the layers of cames in accordance with the process of my invention. Fig. 3 is a section on line 3—3 of Fig. 1. Fig. 4 is a side elevation showing the receptacle in closed position and certain of the adjacent parts of the apparatus of Figs. 1 and 2.

Corresponding parts are designated by the same reference numerals in the several views.

The cames 1 are strips of lead whose cross section is a double channel or I and which are of uniform length. These cames are delivered by the came producing machine through an inclined chute 26 which forms one of the fixed parts of the said apparatus, and which is provided with spring hooks 40 for retaining the cames when the removable chute 27 is disconnected from the chute 26. The removable chute 27 is adapted to be applied to the fixed chute 26 so as to receive a limited number of the finished cames from the said chute. The removable chute is preferably constructed as follows: A series of upper strips 29 and lower strips 30 spaced laterally are secured at one end to a cross bar 84 by means of bolts 85 and thumb nuts 86. The distance between the two sets of strips 29 and 30 may be varied by the use of one or more washers 87 to adapt the chute to cames of different sizes. The strips 30 are covered with a removable sheet of moisture proof paper or other packing 10, such as wax or paraffin paper, and form a sloping table to receive and support the cames. Upon the ends of the cross bar 84 are pintles 33 which are adapted to rest in sockets 34 mounted on standards 35, while the free ends of the strips 30 rest upon the fingers 32 carried by the fixed chute 26. When the removable chute occupies this position the ends of the strips 29 force the springs 40 upward as shown in Fig. 3 so as to permit the cames to slide freely from the chute 26 into the chute 27. The cames are delivered from the fixed chute 26 into the removable chute 27, sliding by gravity to the lower end of the said chute, where the first one abuts against the cross bar 84 and furnishes a support for the succeeding came, and so on. As soon as the chute 27 is filled the attendant removes the said chute and places it upon the bottom of a receptacle 36 which is lined with waxed paper 37 (Fig. 3). A pair of vertical rods 38 are then introduced through the openings 39 formed in the chute 27 and the openings 89 of the receptacle 36 into the floor 88. The attendant then withdraws the removable chute by drawing the same in a direction transverse to the length of the cames and the rods 38 hold the cames and the sheet of paper 10 upon which they rest against withdrawal so that they remain within the receptacle 36. The removable chute is thus unloaded so as to be entirely empty and ready to receive a fresh sheet of paper 10. It is then applied to the fixed chute 26, the pintles 33 resting in the sockets 34 and the strips 30 upon the fingers 32. As soon as the chute is again filled it is placed in the receptacle 36 on top of the layer of cames previously deposited and is withdrawn in the manner previously described so as to leave a second layer of cames separated from the first layer by a sheet of waxed paper 10 as shown. These operations are continued until the receptacle is entirely filled, whereupon the rods 38 are withdrawn, the paper 37 folded over the cames and the receptacle closed by moving the side 90 and cover 92 on the hinges 91 and 93 respectively, the apertures 94 of the cover receiving the dowel pins 95, and the hasp 97 being closed upon the staple 99 and secured by a pin 100 (Fig. 4).

I have shown and described merely one specific embodiment of my invention chosen for illustrative purposes, but it is obvious that it is capable of a great variety of modifications.

Having now described my invention what I claim as new and desire to secure by Letters Patent is as follows:

1. In an apparatus of the class described, a chute comprising a lower member consisting of spaced strips the space between said strips being unobstructed at their outer ends, an upper member parallel to said lower member, and means for securing said members at varying distances from each other.

2. A portable carrying chute comprising a cross bar, a lower member and an upper member each formed of spaced strips attached at one end to said cross bar the spaces between said strips being unobstructed at their outer ends.

3. A portable chute comprising a lower member formed of spaced strips, the spaces between said strips being unobstructed at their outer ends, in combination with means for aiding in the removal of articles from the chute, said means comprising stationary upright pins adapted to project through the spaces between the strips.

THOMAS W. MORRELL.

Witnesses:
SEWARD DAVIS,
OLIVER WILLIAMS.